United States Patent [19]

Tokita et al.

[11] Patent Number: 5,445,855
[45] Date of Patent: * Aug. 29, 1995

[54] ACTIVE ENERGY RAY-CURABLE COMPOSITION AND OPTICAL RECORDING MEDIUM HAVING CURED PRODUCT OF THE COMPOSITION

[75] Inventors: Suguru Tokita, Yamaguchi; Kenji Yamane, Ohtake; Hajime Inagaki, Iwakuni; Masayoshi Kurisu, Ichihara, all of Japan

[73] Assignee: Mitsui Petrochemical Industries, Ltd., Tokyo, Japan

[ * ] Notice: The portion of the term of this patent subsequent to Dec. 1, 2009 has been disclaimed.

[21] Appl. No.: 102,500

[22] Filed: Aug. 5, 1993

Related U.S. Application Data

[60] Division of Ser. No. 931,428, Aug. 24, 1992, abandoned, which is a continuation of Ser. No. 280,588, Dec. 6, 1988, abandoned.

[30] Foreign Application Priority Data

Dec. 8, 1987 [JP] Japan .................................. 62-308724
Dec. 9, 1987 [JP] Japan .................................. 62-309428
Aug. 25, 1988 [JP] Japan .................................. 63-211084

[51] Int. Cl.6 .......................... B32B 3/02; B32B 9/04; B32B 27/32; C08F 2/50
[52] U.S. Cl. .................. 428/65.1; 428/411.1; 428/521; 522/24; 522/25; 522/29; 522/170
[58] Field of Search ......... 428/64, 521, 411.1; 522/24, 25, 29, 170

[56] References Cited

U.S. PATENT DOCUMENTS

| | | | |
|---|---|---|---|
| 4,230,814 | 10/1980 | Crivello | 522/25 |
| 4,374,751 | 2/1983 | Dudgeon | 522/24 |
| 4,533,446 | 8/1985 | Conway et al. | 522/24 |
| 4,576,850 | 3/1986 | Martens | 522/97 |
| 4,688,053 | 8/1987 | Noguchi et al. | 522/102 |
| 4,707,432 | 11/1987 | Gatechair et al. | 522/29 |
| 4,734,444 | 3/1988 | Henne et al. | 522/25 |
| 4,751,124 | 6/1988 | Matsuzawa et al. | 428/65 |
| 4,849,320 | 7/1989 | Irving et al. | 522/25 |
| 4,874,808 | 10/1989 | Minami et al. | 525/210 |
| 4,994,354 | 2/1991 | Toibana et al. | 428/64 |
| 5,032,470 | 7/1991 | Shindo et al. | 428/900 |
| 5,059,462 | 10/1991 | Kurisu et al. | 428/64 |
| 5,073,476 | 12/1991 | Meier et al. | 522/29 |
| 5,096,936 | 3/1992 | Seko et al. | 522/29 |
| 5,167,996 | 12/1992 | Kurisu et al. | 428/64 |
| 5,188,875 | 2/1993 | Yamaoka et al. | 428/412 |

OTHER PUBLICATIONS

K. Meier and H. Zweifel "Photoinitiated Cationic Polymerization of Epoxides with Iron–Arene Complexes" Journal Radiation Curing, pp. 26–32, Oct. 1986.

*Primary Examiner*—Susan W. Berman
*Attorney, Agent, or Firm*—Sherman and Shalloway

[57] ABSTRACT

An active energy ray-curable composition comprising (A) an epoxy resin, (B) a compound selected from the group consisting of sulfonium salts and cyclopentadienyl iron compounds, (C) a compound selected from the group consisting of acrylates, methacrylates and oligomers thereof, and (D) an organic peroxide, and optionally (E) a rubber component. The composition is useful for an adhesive layer of an optical recording medium.

6 Claims, 2 Drawing Sheets

ACTIVE ENERGY RAY-CURABLE COMPOSITION AND OPTICAL RECORDING MEDIUM HAVING CURED PRODUCT OF THE COMPOSITION

This application is a division of application Ser. No. 07/931,428, filed Aug. 24, 1992, now abandoned, which is a continuation of application Ser. No. 07/280,588, filed Dec. 6, 1988, now abandoned.

BACKGROUND OF THE INVENTION

This invention relates to an active ray-curable composition which can be cured by an active energy ray such as ultraviolet ray (UV), electron beams (EB) or radioactive rays, and to an optical recording medium having a cured product of the composition as an adhesive layer, such as an optical recording disc or an optical memory card.

In the prior art, an optical disc is produced by bonding a recording layer formed on a substrate to a light-pervious protective material by means of a photocuring agent. Preferably, the photocuring agent used for this purpose should be bondable within a short period of time, and be free from components which may adversely affect the recording layer. Moreover, it should not impair the optical properties, such as transparency, of the substrate.

Epoxy resin compositions curable by an active energy ray have been known. Many of them, however, have poor adhesion in the early stage of curing, and since their curing time is relatively long, it is impossible to increase the speed of a production line for optical discs. Moreover, many of them have poor adhesion strength in a humid condition.

Substrates made of various resins are known for use in optical recording media. The industry, however, is seeking substrates made of resins which have excellent heat resistance and little shrinkage upon solidification in melt-molding, and long-term dimensional stability under use conditions, particularly little dimensional changes upon moisture absorption in a high-temperature high-humidity condition.

SUMMARY OF THE INVENTION

It is an object of this invention to provide an active energy ray-curable composition having a novel combination of components.

Another object of this invention is to provide an active energy ray-curable composition which can be cured very rapidly by irradiation of an active energy ray.

Still another object of this invention is to provide an active energy ray-curable composition which has excellent adhesion in the early stage of curing and excellent moisture-resistant adhesiveness.

A yet another object of this invention is to provide a novel optical recording medium having a cured product of the above composition of the invention as an adhesive layer.

A further object of this invention is to provide an optical recording medium having an adhesive layer which has high adhesion strength and excellent water resistance and moisture resistance and does not impair the optical properties of the substrate and a substrate layer having excellent dimensional stability under used conditions, particularly at high temperatures and humidities.

Other objects of this invention along with its advantage will become apparent from the following description.

According to this invention, these objects and advantages are firstly achieved by an active energy ray-curable composition comprising (A) an epoxy resin,
(B) a compound selected from the group consisting of sulfonium salts and cyclopentadienyl iron compounds,
(C) a compound selected from the group consisting of acrylates, methacrylates and oligomers thereof, and
(D) an organic peroxide,

BRIEF DESCRIPTION OF THE DRAWINGS

In the accompanying drawings.

DESCRIPTION OF THE INVENTION

The epoxy resin (A) included in the composition of this invention is preferably a compound containing at least two epoxy groups per molecule. Aliphatic or alicyclic epoxy compounds are especially preferred.

Specific examples of the epoxy resin (A) include glycidyl ethers of polyphenolic compounds such as bisphenol A, bisphenol F and 1,1,2,2-tetrakis(4'-hydroxyphenyl)ethane; glycidyl ethers of polyhydric phenols such as catechol, resorcinol, hydroquinone and phloroglucine; glycidyl ethers of polyhydric alcohols such as ethylene glycol, butanediol, glycerol, erythritol and polyoxyalkylene glycol; novolak-type epoxy resins; cycloaliphatic epoxy resins such as vinylcyclohexene dioxide, limonene dioxide and dicyclopentadiene dioxide; polyglycidyl esters of ester condensates of polycarboxylic acids such as phthalic acid and cyclohexane-1,2-dicarboxylic acid; and polyglycidyl amine-type epoxy resins. Of these, the glycidyl ethers of polyphenolic compounds and the novolak-type epoxy resins are preferred. A glycidyl ether of bisphenol A and a glycidyl ether of bisphenol F are more preferred, and the glycidyl ether of bisphenol A is especially preferred.

The composition of this invention contains a sulfonium salt or a cyclopentadienyl iron compound (B).

Triaryl sulfonium salts are preferred as the sulfonium salt, and triphenyl sulfonium salts are especially preferred. The anion of the sulfonium salt is preferably $AsF_6^-$ or $BF_4^-$, for example.

Examples of the sulfonium salt are triphenylsulfonium salts (such as tri-(4-methylphenyl) sulfonium salts (such as and tri-(4-methoxyphenyl)sulfonium salts (such as The cyclopentadienyl iron compound may be, for example, those containing two cyclopentadienyl groups in the molecule, or those having one cyclopentadienyl group and one aromatic group such as a phenyl or isopropylphenyl group in the molecule. The latter are preferred. An iron compound having a cyclopentadienyl group and an isopropylphenyl group is especially preferred.

Examples of the cyclopentadienyl iron compound are cyclopentadienyl isopropylphenyl iron (II) salts such as

As the compound (B) in the composition of this invention, the sulfonium salt and the cyclopentadienyl iron compound may be used singly or in combination. The cyclopentadienyl isopropylphenyl iron (II) salt of the above formula is especially preferred as the compound (B).

The compound (C) in the composition of this invention is selected from acrylates, methacrylates and oligomers of these.

Esters formed between hydroxy compounds or di- or higher polyhydroxy compounds and acrylic or methacrylic acid may be used as the acrylate or methacrylate. The esters may be acrylic or methacrylic esters of hydroxyl compounds such as monohydric aliphatic alcohols having 1 to 20 carbon atoms, alicyclic alcohols having 1 to 30 carbon atoms, dihydric aliphatic alcohols having 1 to 20 carbon atoms, dihydric alicyclic alcohols having 1 to 20 carbon atoms, trihydric alcohols having 1 to 2 carbon atoms and hydroxyl-terminated polyesters.

Specific examples of the esters include
methyl acrylate,
methyl methacrylate,
ethyl acrylate,
ethyl methacrylate,
butyl acrylate,
butyl methacrylate,
2-hydroxy-3-phenoxypropyl acrylate
cyclohexyl acrylate,
norbornyl acrylate,
dicyclopentanyl acrylate,
dicyclopentenyl acrylate,
isobornyl acrylate,
cyclohexyl methacrylate,
hexanecyclo[6,6,1,1$^{3,6}$,1$^{10,13}$,0$^{2,7}$,0$^{9,14}$]heptadecyl-4-acrylate of the following formula 12-methylhexacyclo[6,6,1,1$^{3,6}$,1$^{10,13}$,0$^{2,7}$,0$^{9,14}$]heptadecyl-4-acrylate,
11-methylhexacyclo[6,6,1,1$^{3,6}$,1$^{10,13}$,0$^{2,7}$,0$^{9,14}$]heptadecyl-4-acrylate,
12-ethylhexacyclo[6,6,1,1$^{3,6}$,1$^{10,13}$,0$^{2,7}$,0$^{9,14}$]heptadecyl-4-acrylate,
11-ethylhexacyclo[6,6,1,1$^{3,6}$,1$^{10,13}$,0$^{2,7}$,0$^{9,14}$]heptadecyl-4-acrylate,
octacyclo[8,8,1$^{2,9}$,1$^{4,7}$,1$^{11,18}$,1$^{13,16}$,0,0$^{3,8}$,0$^{12,17}$]docosyl-5-acrylate of the formula 15-methyloctacyclo[8,8,1$^{2,9}$,1$^{4,7}$,1$^{11,18}$,1$^{13,16}$,0,0$^{3,8}$,0$^{12,17}$]docosyl-5-acrylate,
2,7-dimethyltetracyclo[4,4,0,1$^{2,5}$,1$^{7,10}$]dodecyl-3-acrylate,
2,10-dimethyltetracyclo[4,4,0,1$^{2,5}$,1$^{7,10}$]-dodecyl-3-acrylate,
11,12-dimethyltetracyclo[4,4,0,1$^{2,5}$,1$^{7,10}$]-dodecyl-3-acrylate,
tetracyclo[4,4,0,1$^{2,5}$,1$^{7,10}$]dodecyl-3-acrylate of the following formula 9-substituted tetracyclo[4,4,0,1$^{2,5}$,1$^{7,10}$]-dodecyl-3-acrylate (substituent at the 9-position: methyl, ethyl, propyl, isobutyl, hexyl, cyclohexyl, stearyl, bromo, fluoro),
8-substituted tetracyclo[4,4,0,1$^{2,5}$,1$^{7,10}$]-dodecyl-3-acrylate (substituent at the 8-position: methyl, ethyl, propyl, isobutyl, hexyl, cyclohexyl, stearyl, bromo, fluoro),
8,9-disubstituted tetracyclo[4,4,0,1$^{2,5}$,1$^{7,10}$]-dodecyl-3-acrylate (substituents at the 8- and 9-positions: methyl, ethyl, propyl, isobutyl, hexyl, cyclohexyl, stearyl, bromo, fluoro), hexacyclo[6,6,1,1$^{3,6}$,1$^{10,13}$,0$^{2,7}$,0$^{9,14}$]heptadecyl-4-methacrylate,
12-methylhexacyclo[6,6,1,1$^{3,6}$,1$^{10,13}$,0$^{2,7}$,0$^{14}$]heptadecyl-4-methacrylate,
11-methylhexacyclo[6,6,1,1$^{3,6}$,1$^{10,13}$,0$^{2,7}$,0$^{9,14}$]heptadecyl-4-methacrylate,
12-ethylhexacyclo[6,6,1,1$^{3,6}$,1$^{10,13}$,0$^{2,7}$,0$^{9,14}$]heptadecyl-4-methacrylate,
11-ethylhexacyclo[6,6,1,1$^{3,6}$,1$^{10,13}$,0$^{2,7}$,0$^{9,14}$]heptadecyl-4-methacrylate,
octacyclo[8,8,1$^{2,9}$,1$^{4,7}$,1$^{11,18}$,1$^{13,16}$0,0$^{3,8}$,0$^{12,17}$]docosyl-5-methacrylate,
15-methyloctacyclo[8,8,1$^{2,9}$,1$^{4,7}$,1$^{11,18}$,1$^{13,16}$,0,0$^{3,8}$,0$^{12,17}$]docosyl-5-methacrylate,
2,7-dimethyltetracyclo[4,4,0,1$^{2,5}$,1$^{7,10}$]-dodecyl-3-methacrylate,
2,10-dimethyltetracyclo[4,4,0,1$^{2,5}$,1$^{7,10}$]-dodecyl-3-methacrylate,
11,12-dimethyltetracyclo[4,4,0,1$^{2,5}$,1$^{7,10}$]-dodecyl-3-methacrylate,
tetracyclo[4,4,0,1$^{2,5}$,1$^{7,10}$]-dodecyl-3-methacrylate,
9-substituted tetracyclo[4,4,0,1$^{2,5}$,1$^{7,10}$]-dodecyl-3-acrylate (substituent at the 9-position: methyl, ethyl, propyl, isobutyl, hexyl, cyclohexyl, stearyl, bromo, fluoro),
8-substituted tetracyclo[4,4,0,1$^{2,5}$,1$^{7,10}$]-dodecyl-3-methacrylate (substituent at the 8-position: methyl, ethyl, propyl, isobutyl, hexyl, cyclohexyl, stearyl, bromo, fluoro),
8,9-disubstituted tetracyclo[4,4,0,1$^{2,57,10}$]-dodecyl-3-methacrylate (substituents at the 8- and 9-positions: methyl, ethyl, propyl, isobutyl, hexyl, cyclohexyl, stearyl, bromo and fluoro),
polyesters having both ends blocked with acrylic acid as represented by the following formula $$A-M-N)_n-M-A \quad (I)$$

wherein A represents an acrylic acid residue, M represents a divalent aliphatic or alicyclic alcohol residue, N represents a residue of a dibasic acid, and n is a positive number, and polyesters having both ends and the hydroxyl groups in the chain blocked with acrylic acid as represented by the following formula (II)

(II)

wherein A is as defined above, X represents a trihydric or higher aliphatic or alicyclic alcohol residue, Y represents a residue of a dibasic or higher polybasic acid, and m is a positive integer.

Some of these acrylates or methacrylates are disclosed in Japanese Laid-Open Patent Publication No. 136529/1986. These acrylates or methacrylates may be used as oligomers produced by preliminarily polymerizing them by methods known per se.

Alkyl acrylates or methacrylates and a mixture of the compounds of formulae (I) and (II) are preferred as the compoent (C) of the composition of this invention.

The composition of this invention further includes an organic peroxide (D). Examples of the organic peroxide include benzoyl peroxide, dichlorobenzoyl peroxide, cumene hydroperoxide, dicumyl peroxide, di-tert-butyl peroxide, 2,5-dimethyl-2,5-di(peroxidebenzoate)hexyne-2,1,4-bis(tert-butylperoxyisopropyl)benzene, lauroyl peroxide, tert-butyl peracetate, 2,5-dimethyl-2,5-di(tert-butylperoxy)hexyne-3,2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate.

Of these, dialkyl peroxide such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene are preferred.

The composition of this invention comprises the components (A), (B), (C) and (D) as essential components. The composition of the invention preferably comprises 100 parts by weight of the component (A), 1 to 10 parts by weight, especially 2 to 5 parts by weight of the component (B), 15 to 35 parts by weight, especially 20 to 30 parts by weight, of the component (C), and 1 to 10 parts by weight, especially 2 to 5 parts by weight, of the component (D).

A photopolymerization initiator aid is not always necessary in the composition of this invention. If, however, an active energy ray of a relatively low energy, such as UV, is used, it is desirable to incorporate the initiator. The photopolymerization initiator aid may be any of various known initiators which are decomposed upon irradiation of UV, etc. to generate radicals and those from which hydrogen is extracted upon irradiation to generate radicals. Specific examples of the photopolymerization initiator include benzoin and its ethers such as benzoin methyl ether, benzoin ethyl ether, benzoin isopropyl ether and benzoin butyl ether; benzophenone compounds such as benzophenone, p-chlorobenzophenone and p-methoxybenzophenone; benzil compounds such as benzil, benzil dimethylketal; and hydroxyalkyl phenyl ketone compounds such as 1-(4-isopropylphenyl)-2-hydroxy-2-methyl-1-propanone, 1-phenyl-2-hydroxy-2-methyl-1-propanone and 1-(4-tert-butylphenyl)-2-hydroxy-2-methyl-1-propanone.

Examples of sensitizers that may be used in this invention include hydrocarbons such as anthracene, naphthalene, chrysene and phenanthrene; nitro compounds such as p-dinitrobenzene, p-nitroaniline, 1,3,5-trinitrobenzene and p-nitrodiphenyl; amino compounds such as n-butylamine, di-n-butylamine, triethylamine, diethylaminoethyl methacrylate, p-nitroaniline and N-acetyl-4-nitro-1-naphthylamine; phenolic compounds such as phenol, p-nitrophenol, 2,4-dinitrophenol and 2,4,6-trinitrophenol; ketones such as benzaldehyde, 9-anthraldehyde, acetophenone, benzophenone, dibenzalacetone, benzil, p,p'-diaminobenzophenone and p,p'-tetramethyldiaminobenzophenone; quinones such as anthraquinone, 1,2-benzoanthraquinone, benzoquinone, 1,2-naphthoquinone and 1,4-naphthoquinone; and anthrones such as anthrone, 1,9-benzoanthrone, 6-phenyl-1,9-benzoanthrone, 3-phenyl-1,9-benzoanthrone, 2-keto-3-aza-1,9-benzoanthrone and 3-methyl-1,3-diaza-1,9-benzoanthrone.

Basically, the composition of this invention is solventless, but may contain a solvent. Furthermore, the composition of the invention may contain components that can be incorporated in ordinary solventless adhesives, such as reactive diluents, sensitizers, thickening agents, antisagging agents, storage stabilizers and plasticizers.

A rubber component may further be added to the composition of this invention in order to increase adhesion strength and impart flexibility to the composition in adhesive applications.

The rubber component that can be added may be, for example, a styrene/(di)olefin diblock or triblock copolymer or a hydrogenation product thereof. Specific examples include styrene/isoprene copolymer, styrene/butene copolymer, styrene/ethylene copolymer, styrene/butadiene copolymer, styrene/butene/styrene copolymer, stryene/isoprene/styrene copolymer, styrene/ethylene/butene/styrene copolymer, styrene/ethylene/propylene copolymer, and styrene/ethylene/propylene/styrene copolymer. Polyisoprene, butyl rubbers, chrloroprene rubbers, nitrile rubbers, silicone rubbers and acrylic rubbers may also be used as the rubber component. Styrene-containing rubber components are especially preferred.

The amount of the rubber component to be added is up to about 50 parts by weight, preferably 0.05 to 50 parts, more preferably 0.1 to 30 parts by weight, especially preferably 0.2 to 10 parts by weight, per 100 parts by weight of the components (A), (B), (C) and (D) combined.

The composition of this invention is suitable for coating and bonding various substrates, particularly transparent materials, above all optical materials, for example bonding of lenses or optical discs. Particularly when the composition of this invention is to be used for bonding a material containing a substance which is likely to react with a chemical substance and undergo degeneration as in a recording layer of an optical disc, it is preferred to use the oligomer as component (C) and if required, add a photopolymerization initiator.

A substrate to which the composition of this invention is applied may be made of any material. Polycarbonate polymers, (meth)acrylate polymers, ethylene/cycloolefin copolymers and olefin copolymers comprising 4-methyl-1-pentene as a main component are particularly suitable because the composition of this invention shows firm adhesion to these materials.

According to this invention, an optical recording medium comprising a cured product of the composition of the invention as an adhesive layer is provided as a particularly preferred use.

Specifically, the present invention also provides an optical recording medium comprising (I) optical disc substrates made of an ethylene/cycloolefin copolymer consisting substantially of (1) units represented by the following formula (1)

(1)

wherein $R^1$, $R^2$, $R^3$, $R^4$, $R^5$, $R^6$, $R^7$, $R^8$, $R^9$, $R^{10}$, $R^{11}$ and $R^{12}$, independently from each other, represent a hydrogen atom, a halogen atom or an alkyl group having 1 to 20 carbon atoms, $R^9$ may be bonded to $R^{11}$ or $R^{12}$ to form a 3- to 6-membered ring, $R^{10}$ may be bonded to $R^{11}$ or $R^{12}$ to form a 3- to 6-membered ring, n is a positive integer, and when n is at least 2, two or more $R^5$, $R^6$, $R^7$ or $R^8$ groups each may be identical or different, and (2) units represented by the formula $$—CH_2CH_2— \qquad (2)$$

and (II) an adhesive layer composed of a cured product of the above composition comprising components (A), (B), (C) and (D).

The optical disc substrate (I) constituting the optical recording medium of the invention is produced from the ethylene/cycloolefin copolymer.

Preferably, the ethylene/cycloolefin copolymer is composed essentially of 10 to 60 mole % of the units of formula (1) and 90 to 40 mole % of units of formula (2).

The units of formula (1) are derived from a cycloolefin (monomer) represented by the following formula (1)'

(1)' wherein all symbols are as defined with regard to formula (1).

The units of formula (2) are derived from ethylene.

In formula (1)', the halogen atom for $R^1$ to $R^{12}$ may be, for example, fluorine, chlorine, bromine, or iodine, and chlorine or bromine is especially preferred.

The alkyl groups having 1 to 20 carbon atoms may be linear or branched. Examples include methyl, ethyl, propyl, isopropyl, butyl, isobutyl and n-hexyl.

$R^9$ may be bonded to $R^{11}$ or $R^{12}$ to form a 3- to 6-membered ring, and $R^{10}$ may also be bonded to $R^{11}$ or $R^{12}$ to form a 3- to 6-membered ring. The ring is preferably a carbon ring.

n is a positive integer. When n is 0, the above formula (1)' may be rewritten as (1)'1 wherein all symbols are as defined above.

When n is 1, the above formula (1)' may be rewritten as wherein all symbols are as defined above.

When n is 2 in the formula (1)' it may be rewritten as (1)'3 wherein all symbols are as defined above, and $R^5$, $R^6$, $R^7$ and $R^8$ occurring twice may each be identical or different. Cycloolefins of formula (1)'2 are preferred as the cycloolefins of formula (1)' because they are easily available and easy to produce, Those of formula (1)'2 in which all of $R^1$ through $R^{12}$ are hydrogen atoms are particularly preferred because they give polymers having excellent heat resistance or solvent resistance.

Examples of the compounds of formula (1)' are shown below.

-continued

-continued

The above cycloolefins may be produced, for example, by applying the methods described in U.S. Pat. No. 3,557,072 (corresponding to Japanese Patent Publication No. 14910/1971) or Japanese Laid-Open Patent Publication No. 154133/1982.

The copolymer of the monomer of formula (1)' and ethylene may be produced by polymerizing the monomers in the presence of known Ziegler catalysts, particularly vanadium-containing Ziegler catalysts. Such catalysts and polymerization methods are described, for example, in Japanese Laid-Open Patent Publication No. 168,708/1985.

Another monomer may further be copolymerized in the production of the above copolymer in an amount which does not impair the properties of the copolymer, for example not less than 1 mole per mole of ethylene. The other monomer may be, for example, an alpha-olefin or another cycloolefin. Examples include alpha-olefins usually having 3 to 20 carbon atoms, preferably 3 to 10 carbon atoms, such as propylene, 1-butene, 3-methyl-1-butene, 1-pentene, 3-methyl-1-pentene, 4-methyl-1-pentene, 1-hexene, 1-octene, 1-decene, 1-dodecene, 1tetradecene, 1-hexadecene and 1-eicosene. The cycloolefin may be a non-crosslinked cycloolefin or a styrene. Examples are cyclopentene, cyclohexene, 3,4-dimethylcyclopentene, 3-methylcyclohexene, 2-(2-methylbutyl)-1-cyclohexene, styrene and alpha-methylstyrene. Polyenes such as dicyclopentadiene, ethylidenenorbornene and vinylnorbornene can equally be copolymerized. Unsaturated carboxylic acids such as maleic acid or maleic anhydride can also be copolymerized.

The ethylene/cycloolefin copolymer used in this invention preferably has an intrinsic viscosity [η], measured in decalin at 135° C., of 0.03 to 10 dl/g, especially 0.1 to 5 dl/g, a crystallinity, determined by X-ray diffractometry, of not more than 10%, especially not more than 5%, an iodine value of not more than 5, especially not more than 1, and a glass transition temperature (Tg) of 50° to 250° C., especially 60° to 200° C.

The ethylene/cycloolefin copolymer used in this invention is characterized in that the monomer component of formula (1)' mainly assumes the structure of formula (1) in the copolymer. As a result, the iodine value of the polymer is usually not more than 5, mostly not more than 1. This structure is also substantiated by $^{13}$C-NMR.

Owing to this structure, the copolymer is chemically stable and has excellent water resistance, chemical (e.g., alkalies or acids) resistance, solvent resistance, thermal resistance and weather resistance. It has a very low water content, and also excellent dimensional accuracy.

The optical recording medium of this invention may be produced, for example, by coating a solution of the composition of the invention in an organic solvent, for example a ketone such as acetone, methyl ethyl ketone or methyl isobutyl ketone on the surface of a substrate (I), applying another substrate (I) to the coated surface, and applying ultraviolet light, electron beams, radioactive ray or gamma-ray, preferably ultraviolet light, electron beams of radioactive ray to the assembly to cure the composition as an adhesive layer.

The optical recording medium of this invention may be, for example, a medium obtained by bonding substrates both having an optical recording layer to each other by means of the adhesive layer, or a medium obtained by bonding a substrate having an optical recording layer formed thereon to a substrate having no optical recording layer by means of the adhesive layer.

An optical magnetic recording layer, or a phase variation-type recording layer may be provided on the substrate by methods known per se. As required, a reflecting layer composed of a metal film, etc. may further be formed on the optical recording layer. It is also possible to provide an enhance layer composed of a dielectric between the substrate and the optical recording layer or on the optical recording layer.

The novel active energy ray-curable composition provided by this invention cures within a short period of time when irradiated with an active energy ray such as ultraviolet ray, an electron beam, a radioactive ray, a gamma-ray, preferably the ultraviolet ray, electron beam or radioactive ray. It has high adhesion strength and does not impair the optical properties of the substrate. Furthermore, since the composition has no solvent, it does not pollute the environment. The composition of this invention has excellent initial adhesion and moisture-resistant adhesion.

The composition of the invention is particularly preferably used in an optical recording medium.

The active energy ray-curable composition of this invention is especially preferably used as an adhesive for a hub constituting an optical disc and a disc substrate in the production of optical discs.

Figure 1:
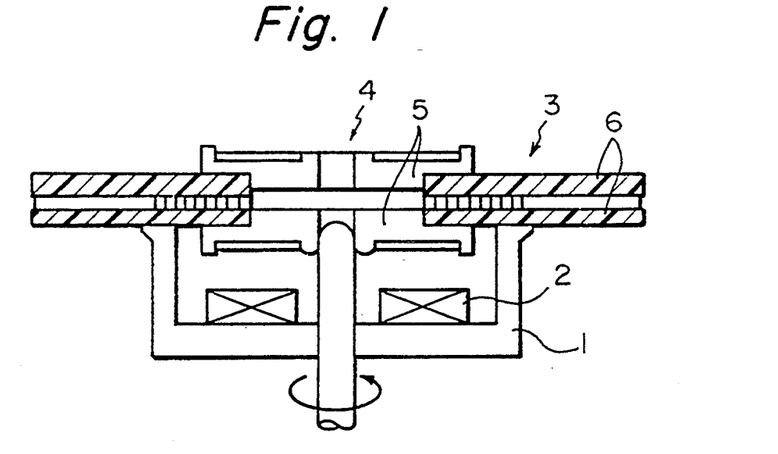
FIG. 1 shows that an optical disc 3 is set on a turntable 1 by a magnetic clamp method.

In an optical drive device for recording and reproducing information, a magnetic lamp method is used in which an optical disc is fixed to a turntable of this device, and rotated at a high speed together with the turntable. FIG. 1 is a rough sectional view showing a turntable and an optical disc showing that the optical disc 3 is secured to the turntable 1. By this method, the optical disc 3 is mounted on the turntable 1 having a magnetic circuit 2 received in a depressed portion in the turntable, and the optical disc is rotated together with the turntable. In mounting the optical disc on the turntable, the optical disc is magnetically attracted to the turntable while the central axis of rotation of the turntable is being aligned with the central axis of rotation of the optical disc turntable. For this purpose, the optical disc to be mounted on the turntable has a magnetically attractable portion 5 with a central hole 4 that constitutes the center of rotation. This magnetically attractable portion is termed the hub in this invention.

In bonding this hub to a disc substrate 6 constituting the optical disc, the active energy ray-curable composition of this invention is preferably used as an adhesive.

The hub may be made of a plastic material such as polycarbonate, a metallic material or a ceramic material. At least the end of that part of the hub which is inserted into the optical disc is formed of a magnetic material. The magnetic material may be a magnetic body itself or a composite of the magnetic body and another material. Specifically, the magnetic material is composed of, for example, (1) a magnetic metal, (2) a plastic material having a magnetic body blended therein, or (3) a plastic material having a magnetic metal applied to the end of its inserting portion. In view of strength and attracting force, the magnetic material is preferably formed of the magnetic metal.

The following examples illustrate the present invention in detail.

The tensile adhesion strength in the following examples was measured and evaluated by the following procedure.

A test piece A ($30 \times 12.7 \times 3$ mm) and a test piece B ($25 \times 12 \times 6.3$ mm) were prepared by injection-molding of a resin. The surfaces of the test pieces were lightly wiped with gauze containing isopropanol. The composition of the invention was coated on the test piece A. The test piece B was applied to the coated surface of the test piece A and manipulated so that the composition was spread uniformly over the adhering surface (adhesion area=0.8 cm$^2$) of the test piece B. The assembly was held by sheets of quartz glass to fix it. An active energy ray was irradiated onto the assembly to cure the applied composition. The appearance of the test pieces after bonding is shown in FIG. 1. In FIG. 1, d=30 mm, e=12.7 mm, f=3 mm, g=25 mm, h=12 mm, i=6.3 mm.

The resulting test sample was pulled at a speed of 50 mm/min. by using a tensile tester (Model 1123, made by Instron Co., Ltd.), and the pulling force was measured. By dividing the pulling force by the adhesion area, the tensile strength of the test sample was determined.

EXAMPLE 1

Preparation of an adhesive

An epoxy resin of the bisphenol A type (EPOMIK R-140 produced by Mitsui Petrochemical Industries, Ltd.) was mixed with an acrylate monomer (Aronix M-5700, produced by Toa Synthetic Chemical Industry, Co., Ltd.) and three acrylate oligomers (Aronix M-6100, M-6300 and M-8030, produced by Toa Synthetic Chemical Industry, Co., Ltd.) in an epoxy resin/M-5700/M-6100/M-6300/M-8030 weight ratio of 80/7/5/3/5. One hundred parts of the resulting mixture was mixed with 2 parts by weight of cyclopentadienyl isopropylphenyl iron (II) salt (a product of Ciba-Geigy Co., Ltd.), 0.25 part by weight of anthracene (Wako Pure Chemicals Co., Ltd.) and 3.1 parts by weight of cumene hydroperoxide (70% grade produced by Kayaku Noury Corporation) to obtain a composition (adhesive) in accordance with the invention.

Adhesion strength

Using the resulting adhesive composition of the invention, polycarbonate (AD-5503 produced by Teijin Chemical Co., Ltd.) and an ethylene/cycloolefin copolymer produced as described below were bonded as shown in FIG. 1. Ultraviolet ray was irradiated onto the assembly for 15 seconds with an illuminance of 160 mW/cm². The tensile strength of the resulting assembly was measured by the method described above. The results are shown in Table 1. Separately, the sample was immersed in a constant temperature-humidity vessel at 80° C. and 85% for 200 hours, and then its adhesion strength was measured. The results are also shown in Table 1.

Production of ethylene/cycloolefin copolymer

Ethylene and 1,3,5,8-dimethano-1,2,3,4,4a,-5,8,8a-octahydronaphthalene (polycyclic olefin of the structural formula to be abbreviated as DMON) were continuously copolymerized in a 2-liter glass polymerization vessel equipped with a stirring vane. Specifically, from the top of the polymerization vessel, a cyclohexane solution of DMON, a cyclohexane solution of $VO(OC_2H_5)Cl_2$ (catalyst), and a cyclohexane solution of ethyl aluminum sesquichloride $[Al(C_2H_2)_{1.5}Cl_{1.5}]$ were continuously fed into the polymerization vessel in such amounts that in the polymerization vessel, the concentration of DMON was 60 g/liter, the concentration of vanadium was 0.9 mmole/liter and the concentration of aluminum was 7.2 mmoles/liter. In the meantime, the polymerization solution was continuously withdrawn from the lower portion of the polymerization vessel so that the amount of the polymerization solution in the polymerization vessel was always 1 liter. Furthermore, from the top of the polymerization vessel, ethylene, hydrogen and nitrogen were fed at a rate of 85 liters, 6 liters and 45 liters, respectively, per hour. The copolymerization reaction was carried out at 10° C. by circulating a coolant through a jacket secured to the outside of the polymerization vessel.

By performing the copolymerization reaction under the above conditions, a polymerization reaction mixture containing an ethylene/DMON copolymer was obtained. A small amount of isopropyl alcohol was added to the polymerization reaction mixture withdrawn from the lower portion of the polymerization vessel to stop the polymerization reaction. The polymerization reaction mixture was put in a home mixer containing actone in an amount three times the weight of the polymerization reaction mixture while the mixer was stirred. The resulting copolymer precipitated was collected by filtration, and dispersed in acetone in a polymer concentration of about 50 g/liter. The copolymer was thus reacted for about 2 hours at the boiling point of acetone. After the treatment, the copolymer was collected by filtration, and dried under reduced pressure at 120° C. for a day and night.

The resulting ethylene/DMON random copolymer obtained had an ethylene content, measured by $^{13}C$-NMR analysis, of 59 mole %, an intrinsic viscosity [η], measured in decalin at 135° C., of 0.42 dl/g, and a glass transition temperature of 136° C.

EXAMPLE 2

Polymethylpentene (TRX ®RT18, produced by Mitsui Petrochemical Industries, Ltd.) and polycarbonate were used as substrates and bonded in the same way as in Example 1.

EXAMPLE 3

The polycarbonate and the ethylene/cycloolefin copolymer were bonded as in Example 1 except that in the preparation of the adhesive composition in Example 1, 1,2-benzoanthraquinone (a product of Aldlich Company) was used instead of anthracene. The results are shown in Table 1.

EXAMPLE 4

Two parts by weight of methyl isobutyl ketone (a product of Wako Pure Chemicals Co., Ltd.) was added to 100 parts by weight of the adhesive composition prepared in Example 1. Using this composition, the ethylene/cycloolefin copolymer and the polycarbonate were bonded as in Example 1. The results are shown in Table 1.

EXAMPLE 5

In the preparation of the adhesive composition in Example 1, triphenyl sulfonium salt was used instead of cyclopentadienyl isopropylphenyl iron (II) salt. Using the resulting adhesive composition, the ethylene/cycloolefin copolymer and the polycarbonate were bonded in the same way as in Example 1. The results are shown in Table 1.

COMPARATIVE EXAMPLE 1

In Example 1, the adhesive composition was prepared without adding the acrylate monomer and acrylate oligomers. Using the resulting adhesive composition, the ethylene/cycloolefin copolymer and the polycarbonate were bonded as in Example 1. The results are shown in Table 1.

EXAMPLE 6

In the preparation of the adhesive composition in Example 1, anthracene was not added. Using the resulting adhesive composition, the ethylene/cycloolefin copolymer and the polycarbonate were bonded as in Example 1. The results are shown in Table 1.

TABLE 1

|  | Tensile adhesion strength (kg/cm²) | |
| --- | --- | --- |
|  | Before the moisture-resistant test | After the moisture-resistant test |
| Example 1 | 16 | 18 |
| Example 2 | 14 | 13 |
| Example 3 | 17 | 15 |
| Example 4 | 18 | 16 |
| Example 5 | 16 | 14 |
| Comparative Example 1 | 14 | 4 |
| Example 6 | 10 | 8 |

EXAMPLE 7

Preparation of a coating agent

A bisphenol A-type epoxy resin (EPOMIC R-140), an acrylate monomer (M-5700) and acrylate oligomers (M-6100, M-6300, and M-8030) were mixed in an epoxy resin/M-5700/M-6100/M-6300/M-8030 weight ratio of 7/5/3/5. The resulting mixture, cyclopentadienyl isopropylphenyl iron (II) salt, anthracene and cyclohexyl hydroperoxide were mixed in a weight ratio of 100/2/0.25/2.5 in this sequence. The resulting mixture was diluted with 7 times its amount of acetone to prepare a coating agent.

Preparation of optical discs

From the same ethylene/cycloolefin copolymer as produced in Example 1, optical disc substrates each having a thickness of 12 mm and a diameter of 130 mm were produced, and an optical magnetic recording layer was formed on their surfaces in a customary manner.

Coating and bonding

Two milliliters of the above coating agent was dropped onto the optical discs and coated by a spinner. The two coated discs were bonded under pressure (20 kg/cm$^2$), and ultraviolet ray was irradiated onto the assembly (160 mM/cm, 30 seconds).

Measurement of the properties of the optical disc

Figure 2:
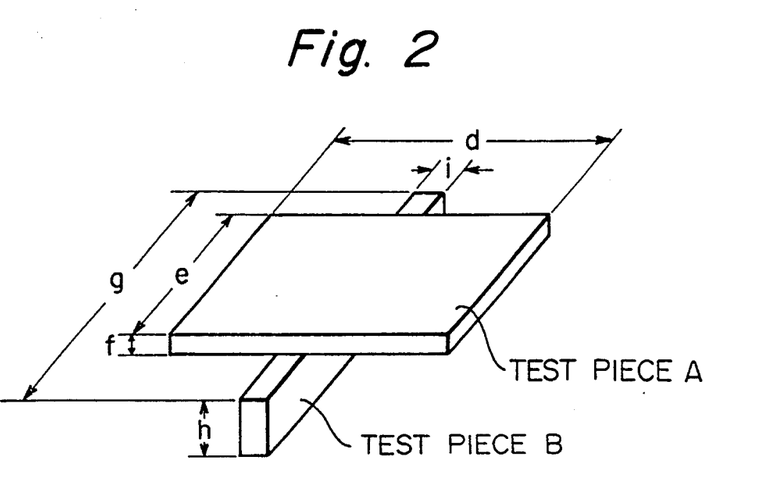
FIG. 2 shows the appearance of a combination of test pieces for examining the adhesiveness of the composition of this invention at the time of curing.
Figure 3:
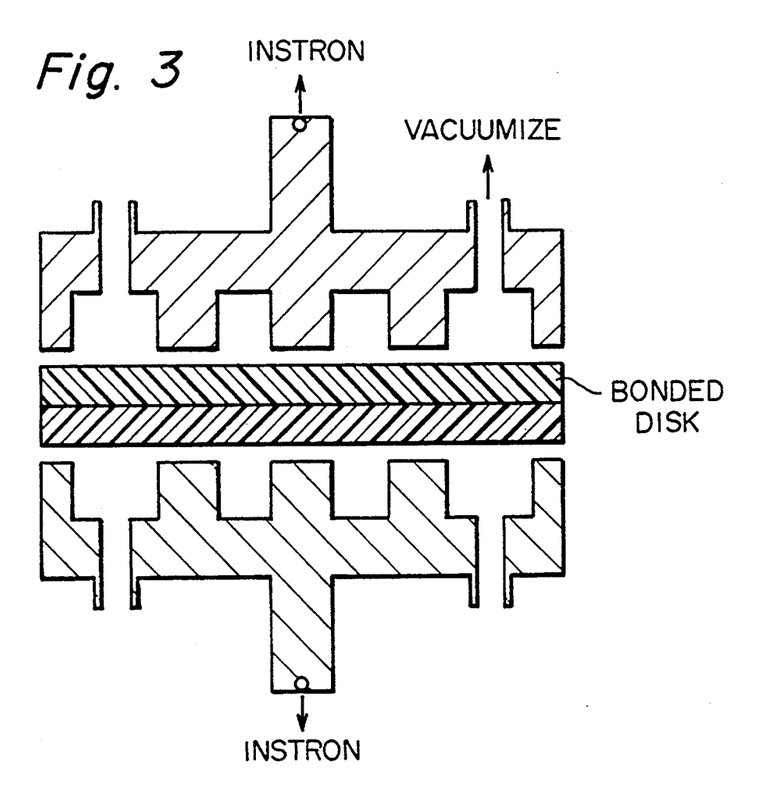
FIG. 3 is a schematic view showing the outline of a device for measuring the adhesion strength of an optical disc.

The adhesion strength of the resulting optical disc so obtained was measured by using the device shown in FIG. 2. As shown in FIG. 2, the bonded optical disc was placed between upper and lower jigs. The pressure was reduced, and while the disc was adhering to the upper and lower jigs, the instrons were pulled upwardly and downwardly, and the pulling strength was measured. The initial strength and the strength after the water-resistant and moisture-resistant test (80° C., 85%, 200 hours) were measured, and the results are shown in Table 2. At this time, no warping of the disc occurred, and no change was observed in the adhesive layer.

EXAMPLE 8

In the preparation of the coating agent in Example 7, 1,2-benzoanthraquinone was added instead of anthracene. Using the resulting coating agent, discs were bonded as in Example 7, and the adhesion strength was measured. The results are shown in Table 2.

EXAMPLE 9

In the preparation of the coating agent in Example 7, triphenylsulfonium tetrafluoroborate of the following formula was used instead of cyclopentadienyl isopropylphenyl iron (II) salt. Using the resulting coating agent, discs were bonded in the same way as in Example 7, and the adhesion strength was measured. The results are shown in Table 2.

TABLE 2

| Example | Adhesion strength (kg/cm$^2$) | |
|---|---|---|
| | Before the water-resistant moisture-resistant test | After the water-resistant moisture-resistant test |
| 7 | >100 | >100 |
| 8 | >100 | 99 |
| 9 | >100 | 96 |

EXAMPLE 10

Preparation of an adhesive 0.5 g of styrene/ethylene/propylene copolymer (KL-1001, a product of Kuraray Inc.; molecular weight 100,000; styrene content 35% by weight) was dissolved in 120 g of a 1:1 mixture of toluene and tetrahydrofuran. Then, 100 g of bisphenol A-type epoxy resin (EPOMIK R-140) was dissolved in the solution. The solution was subjected to an evaporator to evaporate the solvent over the course of 3 to 5 hours. The residue was dried in a vacuum dryer at 40 cmHg and 100° C. for 12 hours. Eighty parts by weight of the resulting composition was mixed with 7, 5, 3 and 5 parts respectively of acrylate monomer (Aronix MK-5700) and three acrylate oligomers (M-6100, M-6300 and M-8030). One hundred parts of the resulting composition was mixed with 2 parts of cyclopentadienyl isopropylphenyl iron (II) salt (a product of Ciba-Geigy Co., Ltd.), 0.25 part by weight of anthracene (a product of Wako Pure Chemical Co., Ltd.) and 3.1 parts by weight of cumene hydroperoxide (70% grade; a product of Kayaku Noury Corporation) to obtain an active energy ray-curable composition.

Using the resulting composition, a test piece A of polycarbonate (AD-5503, a product of Teijin Chemical Co., Ltd.) and a test piece B produced from an ethylene/cycloolefin copolymer produced as indicated hereinabove were bonded as shown in FIG. 2. The assembly was irradiated with ultraviolet ray for 15 seconds with an illuminance of 160 mW/cm$^2$ Using the resulting bonded article as a sample, the tensile adhesion strength of the adhesive was measured.

The adhesion strength of this sample was also measured after it was kept in a constant temperature-humidity vessel at 70° C. and 85% for 200 hours.

The results are shown in Table 3.

EXAMPLE 11

A test piece of stainless steel (SUS 430) and a test piece of an ethylene/cycloolefin copolymer were bonded using the adhesive prepared in Example 10. Using the bonded article as a sample, the tensile adhesive strength of the adhesive was measured as in Example 10.

The results are shown in Table 3.

EXAMPLE 12

An adhesive was prepared in the same way as in Example 10 except that a styrene/isoprene/styrene copolymer (a product of Shell Chemical Co.; molecular weight 115,000; sytrene content 14% by weight) was used instead of the styrene/ethylene/propylene copolymer. The same test pieces as used in Example 10 were bonded to each other using the resulting adhesive. Using the bonded article as a sample, the tensile adhesion strength of the adhesive was measured as in Example 10.

The results are shown in Table 3.

EXAMPLE 13

The same test pieces as used in Example 11 were bonded to each other using the adhesive prepared in Example 12. Using the bonded article as a sample, the adhesion strength of the adhesive was measured as in Example 10.

The results are shown in Table 3.

EXAMPLE 14

An adhesive was prepared in the same way as in Example 10 except that styrene/butene/styrene copolymer (a product of Shell Chemical Co.; molecular weight 72,000; styrene content 28% by weight) was used instead of the styrene/ethylene/propylene copolymer, and triphenyl sulfonium salt was used instead of cyclopentadienyl iron (II) salt. The same test pieces as used in Example 11 were bonded to each other using the resulting adhesive. Using the bonded article as a sample, the tensile adhesion strength of the adhesive was measured as in Example 10.

The results are shown in Table 3.

COMPARATIVE EXAMPLE 3

An adhesive was prepared in the same way as in Example 10 except that cumene hydroperoxide was not added. The same test pieces as in Example 11 were bonded to each other using the resulting agent. Using the bonded article as a sample, the tensile adhesion strength of the adhesive was measured as in Example 10.

The results are shown in Table 3.

EXAMPLE 15

One part by weight of toluene was added to 100 parts by weight of the adhesive prepared in Example 10. Using this adhesive, the same test pieces as used in Example 11 were bonded to each other. Using the bonded article as a sample, the tensile adhesion strength of the adhesive was measured as in Example 10.

The results are shown in Table 3.

TABLE 3

| | Tensile adhesion strength (kg/cm$^2$) | |
|---|---|---|
| | Before the moisture-resistant test | After the moisture-resistant test |
| Example 10 | 17 | 17 |
| Example 11 | 22 | 21 |
| Example 12 | 16 | 17 |
| Example 13 | 19 | 20 |
| Example 14 | 17 | 17 |
| Example 15 | 24 | 23 |
| Comparative Example 3 | 0 | — |

Production of an optical disc substrate

An optical disc substrate having a thickness of 1.2 mm and a diameter of 86 mm was produced from an ethylene/cycloolefin copolymer produced in accordance with Example 1, and an optical magnetic recording layer was formed on it, in a customary manner.

Prodution of a hub

A hub was produced by press working from stainless steel (SUS 430).

Bonding of the hub

The composition of the invention was coated on the optical disc substrate using a dispenser with a rotating turntable (SHOTHMATIC D3 made by Iwashita Engineering Company). The hub was placed on the optical disc substrate, and a load (200 g) was exerted on it. Ultraviolet ray was then irradiated with the same illuminance as in Example 10 to cure the adhesive.

Tensile adhesion strength

Figure 4:
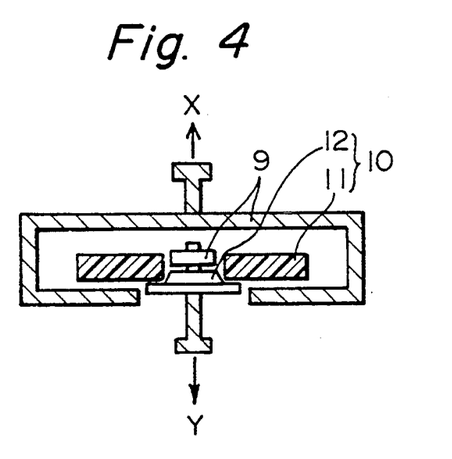
FIG. 4 is a rough sectional view showing a testing method for measuring the adhesion strength between the substrate of an optical disc and a hub.

FIG. 4 is a rough sectional view of jigs 9 and a sample 10.

As shown in FIG. 4, the optical disc substrate 11 and the hub 12 are secured to the jigs for measuring tensile adhesion strength. The sample was pulled in two directions X and Y at a rate of 50 mm/min. by a tensile tester (Model 1123 made by Instron Co.), and the tensile strength of the adhesive was measured. The tensile adhesion strength of the adhesive was determined by dividing the measured tensile strength by the area of adhesion.

EXAMPLE 16

The optical disc substrate 11 and the hub 12 were bonded by using the same adhesive as used in Example 10. Using the bonded article as sample 10, the adhesion strength of the adhesive was measured by the above method.

The results are shown in Table 4.

EXAMPLE 17

The optical disc substrate and the hub were bonded as in Example 16 using the same adhesive as in Example 12. Using the resulting bonded article as sample, the adhesion strength of the adhesive was measured by the above method.

The results are shown in Table 4.

EXAMPLE 18

The optical disc substrate and the hub were bonded as in Example 16 using the same adhesive as in Example 15. Using the resulting bonded article as sample, the adhesion strength of the adhesive was measured by the above method.

The results are shown in Table 4.

TABLE 4

| | Tensile adhesion strength (kg/cm$^2$) | |
|---|---|---|
| Example | Before the moisture-resistant test | After the moisture-resistant test |
| 16 | 13 | 13 |
| 17 | 13 | 12 |
| 18 | 15 | 13 |

We claim:

1. An optical recording medium comprising
   (I) optical disc substrates made of an ethylene/cycloolefin copolymer consisting substantially of
   (1) units represented by the following formula (1)

wherein $R^1$, $R^2$, $R^3$, $R^4$, $R^5$, $R^6$, $R^7$, $R^8$, $R^9$, $R^{10}$, $R^{11}$, and $R^{12}$, independently from each other, represent a hydrogen atom, a halogen atom or an alkyl group having 1 to 20 carbon atoms, $R^9$ may be bonded to $R^{11}$ or $R^{12}$ to form a 3- to 6-membered ring, $R^{10}$ may be bonded to $R^{11}$ or $R^{12}$ to form a 3- to 6-membered ring, n is a positive integer, and when n is at least 2, two or more $R^5$, $R^6$, $R^7$ or $R^8$ groups each may be identical or different and (2) units represented by the formula $$-CH_2CH_2- \qquad (2)$$

and (II) an adhesive layer of a composition comprising as a primary ingredient (A) an epoxy resin, (B) a compound selected from the group consisting of sulfonium salts and cyclopentadienyl iron compounds, (C) a compound selected from the group consisting of acrylates, methacrylates and oligomers thereof, and (D) an organic peroxide.

2. The optical recording medium of claim 1 in which the adhesive layer is the surface of the optical disc substrate and is deposited in the area having a particular radius from its center.

3. The optical recording medium of claim 1 in which the epoxy resin (A) is derived from a glycidyl ether of bisphenol A.

4. The optical recording medium of claim 1 in which the cycopentadienyl iron compounds (B) are cyclopentadienyl isopropylphenyl iron salts.

5. The optical recording medium of claim 1 in which the compound (C) is an ester of acrylic or methacrylic acid with an alcohol having a cyclohydrocarbon group, or an oligomer of the ester.

6. The optical recording medium of claim 1 in which the compound (C) is a mono- or poly-acrylate or a polymethacrylate of a polyester polyol, or an oligomer of the acrylate or methacrylate.

* * * * *